United States Patent [19]

Fritz et al.

[11] 3,838,231

[45] Sept. 24, 1974

[54] METHOD OF PERFORMING SERVICE PROCEDURES IN A COMPUTER CONTROLLED TELECOMMUNICATION SWITCHING CENTER

[75] Inventors: Robert Fritz, Munich; Werner Simon, Darmstadt, both of Germany

[73] Assignee: Siemens Aktiengesellschaft, Berlin and Munich, Germany

[22] Filed: Oct. 24, 1972

[21] Appl. No.: 300,325

[30] Foreign Application Priority Data

Oct. 27, 1971 Germany........................... 2153623

[52] U.S. Cl......................... 179/175.2 R, 340/172.5

[51] Int. Cl............................................ H04m 3/00

[58] Field of Search........... 340/172.5; 179/175.2 R, 179/18 FH, 175, 175.3 R

[56] References Cited

UNITED STATES PATENTS

| | | | |
|---|---|---|---|
| 3,576,951 | 5/1971 | Uchida | 179/18 FH |
| 3,626,383 | 12/1971 | Oswald | 179/175.2 R |
| 3,685,039 | 8/1972 | Flanagan | 340/172.5 |
| 3,689,894 | 9/1972 | Laura | 340/172.5 |
| 3,702,987 | 11/1972 | Twyford | 340/172.5 |

*Primary Examiner*—Kathleen H. Claffy
*Assistant Examiner*—Douglas W. Olms

[57] ABSTRACT

A method of operation for a computer controlled telecommunication switching system is described. In particular the method provides a mode of operation by which positions of a testing station are connected. Calls leading to a position of the testing station cause the identity of the calling subscriber station to be ascertained. The call number, so obtained, is used to address and retrieve subscriber test data from a subscriber data storage. This data is displayed on a video data terminal associated with the testing station position to which the aforementioned call is connected.

5 Claims, 1 Drawing Figure

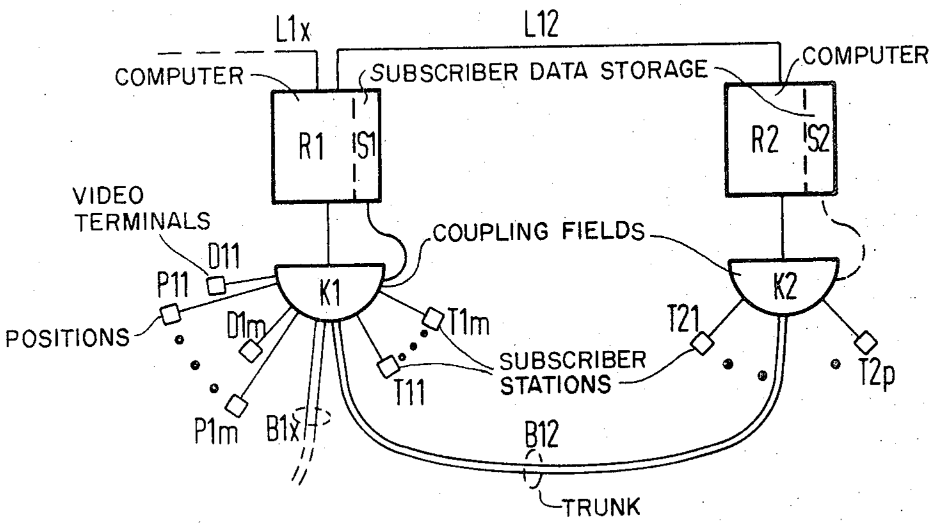
L1x
L12
COMPUTER
SUBSCRIBER DATA STORAGE
COMPUTER
R1
S1
R2
S2
VIDEO TERMINALS
COUPLING FIELDS
D11
P11
K1
K2
POSITIONS
D1m
T1m
T21
SUBSCRIBER STATIONS
T11
T2p
P1m
B1x
B12
TRUNK

METHOD OF PERFORMING SERVICE PROCEDURES IN A COMPUTER CONTROLLED TELECOMMUNICATION SWITCHING CENTER

BACKGROUND OF THE INVENTION

It is known to provide telecommunication switching centers, more particularly telephone switching centers, with means for giving information and in so doing to employ a data processor of known construction which is capable of being dialed from subscriber stations and controlled via the telephone subscriber lines as a central fully automatic inquiry station (see, e.g., German Patent Publication No. 1,291,796). The aforesaid data processor or computer may be used as a reference source by the subscriber stations (see "Elektronische Rechenanlagen" 9, 1967, Vol. 3, pp. 117–118). In this connection, programs available for all users may be utilized, and, furthermore, programs may, likewise, be provided which are available for certain subscribers only. These programs are employed to perform special services. Thus, they supplement the control switching processes that take place normally. They may be run automatically, for example, in response to a special service identification character assigned to a calling or called subscriber station (see German Unexamined and published Patent Application No. 1,941,265).

It is also commonly known to automate the operating services in the telephone switching art (see "Informationen-Fernsprech-Vermittlungstechnik," 1970, pp. 8–10 which is published in the English language). In these automatic system data malfunctions, traffic and test data, charge data, etc., are to be recorded. With these data one can, for example, block and release equipment and subscriber stations, initiate check and diagnostic programs, as well as special storage interrogations and the like. To this end, a provision is made, by means of a computer, to store the incoming messages for documentation and statistics, etc, to arrange them according to priority and to interpret and, where applicable, to display them in video data terminals or console typewriters. Storage interrogations, and variations of stored data may effectively be carried out by this computer. The computer may be connected with a plurality of central controls, or the computers which control switching and connection completion operations, by data channels for accepting messages. In this case, it may be utilized, in the manner previously described, as a data processor or computer for automatically giving information by means of special programs.

As described hereinabove, it is desirable to make use of video data terminals if a data processor or computer is utilized, for these terminals give rapid and direct access to stored information. A conversation between a subscriber station and the computer may be developed in the known manner through the use of a video data terminal (see also "Electronische Rechenanlagen," 1971, pp. 78–80; "Internationale Elektronische Rundschau," 1970, pp. 162–164). In the course of this conversation, the data displayed through the video data terminals may also be changed arbitrarily (see U.S. Pat. No. 3,688,272). In this arrangement, the participating subscriber station itself acts as a data terminal. There are various possibilities for retransmitting data from a subscriber station. For example, in a keyboard telephone, the associated auxiliary keyboard may be used (see Siemens-Zeitschrift 1971, pp. 417–420, published in the English language by Siemens Aktiengesellschaft, Munich, West Germany).

An object of this invention is to provide a method for executing special operating procedures that go beyond switching processes and to combine and develop the same in a computer controlled telephone switching center with the technique known for video data terminals.

An additional object is to provide a method whereby test data are rapidly made available to a station adapted to process this kind of data for removing a malfunction or causing the removal of same.

SUMMARY OF THE INVENTION

The invention concerns a method for performing operating procedures that go beyond switching processes in a computer controlled telephone switching center of the like, wherein a testing station, i.e., a station adapted to detect and correct malfunctioning part of the system, is connected to the system.

This method is characterized in that control system calls, each leading to a position of the testing station, initiate the identification of the called subscriber station. By means of the call number of the calling subscriber station, thus obtained, the associated subscriber test data are called from a subscriber data storage and displayed on a video data terminal associated with the position concerned. Thus, the invention achieves the object of making available very rapidly the data required in a testing station during a call, so that the testing station can answer the call very rapidly and, where necessary, take additional steps immediately thereafter concerning the correction of the malfunction. This rapid operation is necessary since the testing station, at the request of subscribers or telecommunication centers, investigates malfunctions in telecommunication equipment, causing and supervising the elimination thereof, if it does not remove the malfunctions itself.

The testing station also cooperates in executing orders for the construction of new installations and change of connections. It accepts reminders of malfunctions. Where necessary, it looks after the correspondence with the subscribers. As a rule, all these procedures require subscriber test data, in particular if such a procedure is effected through the call from the subscriber station concerned. The use of the method in accordance with the invention greatly facilitates the execution of these procedures, avoiding papers which are needed for a short period only, which in the last analysis leads to significant economical savings through the reduction of the operating staff.

BRIEF DESCRIPTION OF THE DRAWINGS

The principles of this invention will be most readily understood by reference to a description, given hereinbelow, of a preferred form for its execution and to the drawing, described as follows.

The single FIGURE of the drawing illustrates in a block-schematic and simplified form interconnected computer controlled telephone switching centers arranged to operate in accordance with the invention.

DETAILED DESCRIPTION OF THE DRAWINGS

In the accompanying drawing is shown a preferred embodiment of an arrangement using interconnected computer controlled telephone switching centers, wherein the method in accordance with the invention is employed. It is to be noted that the construction and arrangement of the individual elements of each switching center are known and are described herein only as necessary to facilitate an understanding of the invention.

A first computer controlled telephone switching center has a coupling field K1, which is controlled by a computer R1, provided with the subscriber data storage S1. To the coupling field K1 are connected the positions P11 . . . P1*m* to which are assigned the video data terminals D11 . . . D1*m* and which are associated with a repair station (not shown). Further, subscriber stations T11 . . . T1n are connected to coupling field K1, as shown. Over a line which runs from the subscriber data storage S1 to the coupling field K1, subscriber data supplied by this subscriber data storage may be transferred to a video data terminal. The coupling field K1 is further connected via a trunk group B12 with coupling field K2 of another telephone switching center. Further, other trunk groups, such as B1x, run from the coupling field K1 to other switching centers.

Coupling field K2 of the other telephone switching center shown in the drawing is controlled by a computer R2 having the subscriber data storage S2, which, in turn, may be connected with the coupling field K2. The subscriber stations T21 . . . T2p are connected to the coupling field K2. The computers R1 and R2 are further interconnected by the data channel K12. A data channel runs from the computer R1 to a telephone switching center (not shown) labeled L1x.

If, for example, the subscriber T11 calls the position P11 of the testing station, the operation resulting in the identification of this subscriber station is initiated. By means of the call number, thus obtained, the associated subscriber testing data are called in from the subscriber data storage S1 and routed via the coupling field K1 to the video data terminal, which displays this data. If the position P11 is called from the subscriber station T21, then first the call number of the calling subscriber station T21 is obtained in the switching center with the coupling field K2, the computer R2 and the subscriber data storage S2, and the associated subscriber testing data are called in from the subscriber data storage S2. The subscriber station T21 is connected with the position P11 via the coupling field K2, a line of the trunk group B12, and the coupler K11. The subscriber testing data supplied by the subscriber data storage S2 may now be transferred either via the coupling field K2, the aforesaid line of the trunk group B12 or the coupling K1 to the video data terminal D11. However, they may, instead, also be transferred via another line of the trunk group B12 or via the data channel L12 to the coupling field K1 and from there to the video data terminal D11. It is not necessary that the subscriber data storage S2 be connected with the coupling field K2 via a circuit. This circuit is, therefore, shown in broken line.

In carrying out the method according to the invention, the calling subscriber station must be identified. To achieve this, known identification methods may be employed (e.g., British Pat. No. 979,526 German Unexamined and published Patent Application 922,352; 1,762,618; and 1,958,221). For example, in signalling the called position an identification potential may be applied to a line of the communication path established. This initiates the identification of the calling subscriber station in the known manner; whereupon, its call number, thus obtained, is retransmitted to the subscriber data storage. There, it is utilized as an address for calling in information. If deemed advisable, it may, while being used, also be subjected to a conversion by means of an allocator.

For calls coming from another switching center and going to the switching center with the testing station, the call number obtained in the switching center of the calling subscriber station is transferred to the switching center with the testing station. For this purpose, either the communication path connecting these two switching centers and established during the call may be used, or a special data channel which, for example, connects the central control units of these two switching centers might be used. By means of the central control unit, which is associated with the switching center containing the testing station, the transferred call number is then retransmitted to the subscriber data storage. Other methods may, likewise, be employed for the identification. In any case, the obtained call numbers associated with subscriber stations, whose subscriber data are not held in the subscriber data storage, because these subscriber stations are associated with switching centers lying outside the area of the testing station, cause the display of a corresponding error indication by the video data terminal.

If subscriber testing data are displayed in the video data terminal concerned, immediately after the display, these data may be supplemented or altered from the relevant position of the testing station using the conversational mode with the associated video data terminal. During this time, the messages supplied by the calling subscriber station are taken into consideration. In this case, the known technique for the conversational mode may be employed.

An example will now be given as to how the method in accordance with the invention may be carried out. A position of a testing station is called from a subscriber station of a telephone switching center which is connected to another computer controlled telephone switching center. The call number of the testing station is selected in the aforesaid subscriber station, whereupon in the known manner the latter is connected with a position of this testing station via selector lines. In so doing, the position of the testing station is treated like that of a subscriber station connected to the computer controlled telephone switching center. When the selected position of the testing station is signalled by removing the associated handset from the cradle, of the telephone instrument, the identification of the calling subscriber station is initiated. The central control unit of this telephone switching center evaluates in a particular way the removal of this handset, i.e., differently from normal subscriber stations, thus bringing about the identification in question.

For this identification operation, an identification potential is applied to a selector line over which the communication path is established. This identification potential causes, in the known manner, the identification of the calling subscriber station in the associated telephone switching center. Thereupon, the call number, thus obtained, is retransmitted via this communication path or via a special data channel to the central control unit of the telephone switching center, where the positions of the testing station are connected.

If a call number is involved which is associated with a subscriber station lying inside the area of the testing station, the subscriber testing data may be accessed by means of this call number from the subscriber data storage. The data are then routed to a video data terminal for display. From the relevant position of the testing station these subscriber testing data may be noted and considered when the call of the subscriber station is answered. The messages supplied therefrom may then be utilized to supplement or alter in the conversational mode the subscriber testing data displayed. This supplementing may, for example, concern a malfunction that has newly occurred.

In practice, it may be desirable to use a computer controlled switching center solely for performing operating services. These services include, aside from the operating service for the testing station, an operating service for a maintenance station, which is used to maintain an adequate quality of the switching services required of the various switching centers, and an operating service for an absent subscriber service station. In this case, the positions of such service stations and the video data terminals, but none of the public subscriber stations, are connected as subscriber stations to the computer controlled switching center.

The principles of this invention have been described in terms of a preferred inventive method. It is to be remembered that the described system may be modified or changed, but still operate according to the method of the invention, as defined by the appended claims.

We claim:

1. A method for operating a computer controlled telecommunication switching center having subscriber stations and a testing station and having a storage for subscriber test data, comprising the steps of:

initiating an operation for identifying the source of a call directed to a position of said testing station, said source being a subscriber station identified by a call number, said identifying operation being triggered responsive to the occurrence of said call, addressing, by means of said call number, a location in said subscriber data storage having subscriber test data for the calling subscriber station, retrieving the subscriber test data from said addressed storage location and displaying said retrieved data on a video display terminal associated with the called position of said testing station.

2. The method defined in claim 1 wherein said initiating step is triggered by the application of an identification potential to a line of the communication path established for said call in order to signal the position of said line.

3. The method defined in claim 1 comprising the additional step of:

one of altering or supplementing data displayed on said video display terminal responsive to messages from the calling subscriber station using the conventional mode for communicating with said video display terminal.

4. A method for operating computer controlled telecommunication systems, one of said systems having at least a subscriber station connected thereto and another having at least a testing station connected thereto, said systems being equipped with subscriber data storages, for a call from a subscriber station in said one system to a position of said testing station in said other system, comprising the steps of:

initiating an operation in said one system, responsive to said call, for identifying the source of said call, the source being a subscriber station having a call number, transmitting said call number to said other system, addressing a location in said subscriber data storage in said other system having subscriber test data for the calling subscriber station, retrieving said data in said addressed location and displaying said retrieved data on a video display terminal.

5. The method defined in claim 4 comprising the additional step of:

displaying an error indication on said video display terminal when the call number identifies a subscriber station outside the area served by said test station.

* * * * *